(12) United States Patent
Kim et al.

(10) Patent No.: US 8,419,096 B2
(45) Date of Patent: Apr. 16, 2013

(54) ROBOT HAND AND ROBOT HAVING THE SAME

(75) Inventors: Yong Jae Kim, Seoul (KR); Ja Woo Lee, Seoul (KR); Kang Min Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 12/984,945

(22) Filed: Jan. 5, 2011

(65) Prior Publication Data
US 2011/0163561 A1 Jul. 7, 2011

(30) Foreign Application Priority Data
Jan. 7, 2010 (KR) .................. 10-2010-0001368

(51) Int. Cl.
*B25J 15/00* (2006.01)
(52) U.S. Cl.
USPC .............................. 294/111; 294/106; 901/28
(58) Field of Classification Search .................. 294/106, 294/111; 414/5, 7; 623/24, 57, 64; 901/21, 901/28, 29; 74/490.04, 490.05, 490.06
See application file for complete search history.

(56) References Cited

U.S. PATENT DOCUMENTS

| 4,865,376 | A | * | 9/1989 | Leaver et al. ................. 294/111 |
| 4,921,293 | A | * | 5/1990 | Ruoff et al. .................... 294/111 |
| 4,946,380 | A | * | 8/1990 | Lee ................................. 623/24 |
| 5,080,682 | A | * | 1/1992 | Schectman ..................... 623/64 |
| 5,447,403 | A | * | 9/1995 | Engler, Jr. ........................ 414/4 |
| 5,570,920 | A | * | 11/1996 | Crisman et al. ............... 294/111 |
| 2001/0028174 | A1 | * | 10/2001 | Matsuda et al. .............. 294/106 |
| 2009/0015026 | A1 | * | 1/2009 | Matsuda et al. .............. 294/106 |
| 2010/0061835 | A1 | * | 3/2010 | Sim ............................... 414/732 |

FOREIGN PATENT DOCUMENTS

| EP | 1 354 670 A1 | 10/2003 |
| WO | 2008/123271 A1 | 10/2008 |

* cited by examiner

*Primary Examiner* — Paul T Chin
(74) *Attorney, Agent, or Firm* — Staas & Halsey LLP

(57) ABSTRACT

A robot hand may have an improved structure so that movements of some of joints of a finger structure do not influence operations of other joints. A meta phalangeal (MP) roll joint unit rotated in a roll direction and an MP pitch joint unit rotated in a pitch direction of an MP joint unit are separately arranged to form an offset. Movable angles of the respective joint units are widened, and the joint units are precisely controlled. Overall friction within the robot hand is reduced, and a robot having the hand is stabilized.

22 Claims, 13 Drawing Sheets

FIG. 8

$$\begin{bmatrix} Qr \\ Qm \\ Qp \\ Qd \end{bmatrix} = \begin{bmatrix} \dfrac{1}{Rr} & 0 & 0 \\ \dfrac{Nd\ Rd}{Rp\ Rr} & \dfrac{1}{Rp} & 0 \\ -\dfrac{Nd\ Rd\ Rg}{Rp\ Rr\ Rgp} & \dfrac{Rg}{Rp\ Rgp} & \dfrac{1}{Rgp} \\ -\dfrac{Nd\ Rd\ Rg\ Rcp}{Rp\ Rr\ Rgp\ Rcd} & \dfrac{Rg\ Rcp}{Rp\ Rgp\ Rcd} & \dfrac{Rcp}{Rgp\ Rcd} \end{bmatrix} \begin{bmatrix} Lr \\ Lp \\ Lg \end{bmatrix}$$

ROBOT HAND AND ROBOT HAVING THE SAME

CROSS-REFERENCE TO RELATED APPLICATIONS

This application claims the benefit of Korean Patent Application No. 10-2010-0001368, filed on Jan. 7, 2010 in the Korean Intellectual Property Office, the disclosure of which is incorporated herein by reference.

BACKGROUND

1. Field

Example embodiments relate to a robot hand which is not influenced by movement of other joints, and a robot having the same.

2. Description of the Related Art

Robots of various types for household, military, and industrial purposes, such as a bipedal walking robot and a quadrupedal walking robot, have been developed.

Particularly, a humanoid robot is a robot which has a structure similar to a body structure of a human to perform motions similar to those of the human.

Such a humanoid robot performs various motions as well as walking motions, such as running and walking, through movements of joints similar to those of the human.

The humanoid robot includes robot hands having a shape corresponding to that of a human hand, and may perform a motion similar to a motion performed by the human hand using the robot hands.

The robot hand includes a base unit corresponding to the palm and back of the human hand, and finger structures corresponding to fingers of the human hand. The finger structures are rotatably provided on the base unit and are used to grip an object.

SUMMARY

Therefore, it is an aspect of the example embodiments to provide a robot hand having an improved structure and not allowing movements of joints of a finger structure to influence operations of other joints, and a robot having the same It is another aspect of the example embodiments to provide a robot hand minimizing friction, and a robot having the same.

It is a further aspect of the example embodiments to provide a robot hand which allows movable angles of joint units to be wide and is precisely controlled, and a robot having the same.

The foregoing and/or other aspects are achieved by providing a robot hand including a base unit, a plurality of finger structures connected to the base unit, driving units to drive the plurality of finger structures; and wires to transmit a driving force from the driving units to the plurality of finger structures, each of the plurality of finger structures including a meta phalangeal (MP) joint unit connecting the base unit and each of the plurality of finger structures, wherein the MP joint unit includes an MP roll joint unit rotated in a roll direction, and an MP pitch joint unit rotated in a pitch direction, and the MP roll joint unit and the MP pitch joint unit are separately arranged to form an offset.

Each of the plurality of finger structures may further include a first structure connected to the MP pitch joint unit, a second structure connected to the first structure, a third structure connected to the second structure, a proximal interphalangeal (PIP) joint unit connecting the first structure and the second structure and rotated in the pitch direction, and a distal interphalangeal (DIP) joint unit connecting the second structure and the third structure and rotated in the pitch direction.

The MP pitch joint unit may include a first MP pitch pulley fixed to the first structure and rotated in the pitch direction, a second MP pitch pulley freely rotated coaxially with the MP roll joint unit, and a third MP pitch pulley and a fourth MP pitch pulley arranged between the first MP pitch pulley and the second MP pitch pulley and freely rotated.

The wires may include a first MP pitch wire and a second MP pitch wire to drive the MP pitch joint unit, the first MP pitch wire may be fixed to and wound on the first MP pitch pulley, pass through the third MP pitch pulley, be wound on the second MP pitch pulley one time, and be extended downward, and the second MP pitch wire may be fixed to and wound on the first MP pitch pulley in a direction opposite to a winding direction of the first MP pitch wire, pass through the fourth MP pitch pulley, be wound on the second MP pitch pulley one time in the direction opposite to the winding direction of the first MP pitch wire, and be extended downward.

The MP roll joint unit may include an MP roll pulley rotated in the roll direction, and the wires may include a first MP roll wire and a second MP roll wire, having one end fixed to the MP roll pulley, and wound on the MP roll pulley in opposite directions.

The PIP joint unit may include a first PIP pulley fixed to the second structure and rotated in the pitch direction, a second PIP pulley arranged below the first PIP pulley and freely rotated, a third PIP pulley arranged below the second PIP pulley and freely rotated coaxially with the first MP pitch pulley, and a fourth PIP pulley and a fifth PIP pulley arranged in parallel and below the third PIP pulley and freely rotated.

The wires may include a first PIP wire and a second PIP wire to drive the PIP joint unit, the first PIP wire may be fixed to and wound on the first PIP pulley, pass through the second PIP pulley and the third PIP pulley, be arranged coaxially with a rotary axis of the MP roll joint unit, pass through the fourth PIP pulley, and be extended downward, and the second PIP wire may be fixed to and wound on the first PIP pulley in a direction opposite to a winding direction of the first PIP wire, pass through the third PIP pulley, be arranged coaxially with the rotary axis of the MP roll joint unit, pass through the fifth PIP pulley, be wound on the fourth PIP pulley one time, and be extended downward.

The DIP joint unit may include a first DIP pulley fixed to the third structure and rotated in the pitch direction, and a second DIP pulley rotated in connection with the second structure.

The wires may include a first DIP wire provided with one end fixed to and wound on the first DIP pulley and another end fixed to and wound on the second DIP pulley, and a second DIP wire provided with one end fixed to and wound on the first DIP pulley in a direction opposite to a winding direction of the first DIP wire and another end fixed to and wound on the second DIP pulley in the direction opposite to the winding direction of the first DIP wire.

The first DIP wire and the second DIP wire may cross.

The PIP joint unit may include an eleventh PIP pulley fixed to the second structure and rotated in the pitch direction, a twelfth PIP pulley arranged below the eleventh PIP pulley and freely rotated coaxially with the first MP pitch pulley, and a thirteenth PIP pulley and a fourteenth PIP pulley arranged in parallel below the twelfth PIP pulley and freely rotated.

The wires may include an eleventh PIP wire and a twelfth PIP wire to drive the PIP joint unit, the eleventh PIP wire may be fixed to and wound on the eleventh PIP pulley, pass through the twelfth PIP pulley, be arranged coaxially with a rotary axis of the MP roll joint unit, pass through the thirteenth PIP pulley, and be extended downward, and the twelfth PIP wire may be fixed to and wound on the eleventh PIP pulley in a direction opposite to a winding direction of the eleventh PIP wire, pass through the twelfth PIP pulley, be arranged coaxially with the rotary axis of the MP roll joint unit, pass through the fourteenth PIP pulley, and be extended downward.

The foregoing and/or other aspects are achieved by providing a robot having a robot hand which grips an object, the robot hand including a base unit, a plurality of finger structures connected to the base unit, driving units to drive the plurality of finger structures, and wires to transmit a driving force from the driving units to the plurality of finger structures, each of the plurality of finger structures including a meta phalangeal (MP) joint unit connecting the base unit and each of the plurality of finger structures, wherein the MP joint unit includes an MP roll joint unit rotated in a roll direction, and an MP pitch joint unit rotated in a pitch direction, and the MP roll joint unit and the MP pitch joint unit are separately arranged to prevent movement of one of the MP roll joint unit and the MP pitch joint unit from influencing operation of the other one of the MP roll joint unit and the MP pitch joint unit.

Each of the plurality of finger structures may further include a first structure connected to the MP pitch joint unit, a second structure connected to the first structure, a third structure connected to the second structure, a proximal interphalangeal (PIP) joint unit connecting the first structure and the second structure and rotated in the pitch direction, and a distal interphalangeal (DIP) joint unit connecting the second structure and the third structure and rotated in the pitch direction.

The MP pitch joint unit may include a first MP pitch pulley fixed to the first structure and rotated in the pitch direction, a second MP pitch pulley freely rotated coaxially with the MP roll joint unit, and a third MP pitch pulley and a fourth MP pitch pulley arranged and freely rotated between the first MP pitch pulley and the second MP pitch pulley.

The wires may include a first MP pitch wire and a second MP pitch wire to drive the MP pitch joint unit, the first MP pitch wire may be fixed to and wound on the first MP pitch pulley, pass through the third MP pitch pulley, be wound on the second MP pitch pulley one time, and be extended downward, and the second MP pitch wire may be fixed to and wound on the first MP pitch pulley in a direction opposite to a winding direction of the first MP pitch wire, pass through the fourth MP pitch pulley, be wound on the second MP pitch pulley one time in the direction opposite to the winding direction of the first MP pitch wire, and be extended downward.

The MP roll joint unit may include an MP roll pulley rotated in the roll direction, and the wires may include a first MP roll wire and a second MP roll wire, each provided with one end fixed to the MP roll pulley, and wound on the MP roll pulley in opposite directions.

The PIP joint unit may include a first PIP pulley fixed to the second structure and rotated in the pitch direction, a second PIP pulley arranged below the first PIP pulley and freely rotated, a third PIP pulley arranged below the second PIP pulley and freely rotated coaxially with the first MP pitch pulley, and a fourth PIP pulley and a fifth PIP pulley arranged in parallel and below the third PIP pulley and freely rotated.

The wires may include a first PIP wire and a second PIP wire to drive the PIP joint unit, the first PIP wire may be fixed to and wound on the first PIP pulley, pass through the second PIP pulley and the third PIP pulley, be arranged coaxially with a rotary axis of the MP roll joint unit, pass through the fourth PIP pulley, and be extended downward, and the second PIP wire may be fixed to and wound on the first PIP pulley in a direction opposite to a winding direction of the first PIP wire, pass through the third PIP pulley, be arranged coaxially with the rotary axis of the MP roll joint unit, pass through the fifth PIP pulley, be wound on the fourth PIP pulley one time, and be extended downward.

The DIP joint unit may include a first DIP pulley fixed to the third structure and rotated in the pitch direction, and a second DIP pulley rotated in connection with the second structure.

The wires may include a first DIP wire provided with one end fixed to and wound on the first DIP pulley and another end fixed to and wound on the second DIP pulley, and a second DIP wire provided with one end fixed to and wound on the first DIP pulley in a direction opposite to a winding direction of the first DIP wire and another end fixed to and wound on the second DIP pulley in the direction opposite to the winding direction of the first DIP wire.

The first DIP wire and the second DIP wire may cross.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 is a relational expression illustrating relations between movements of wires and rotating angles of respective joint units using radii of respective pulleys.

DETAILED DESCRIPTION

Figure 1:
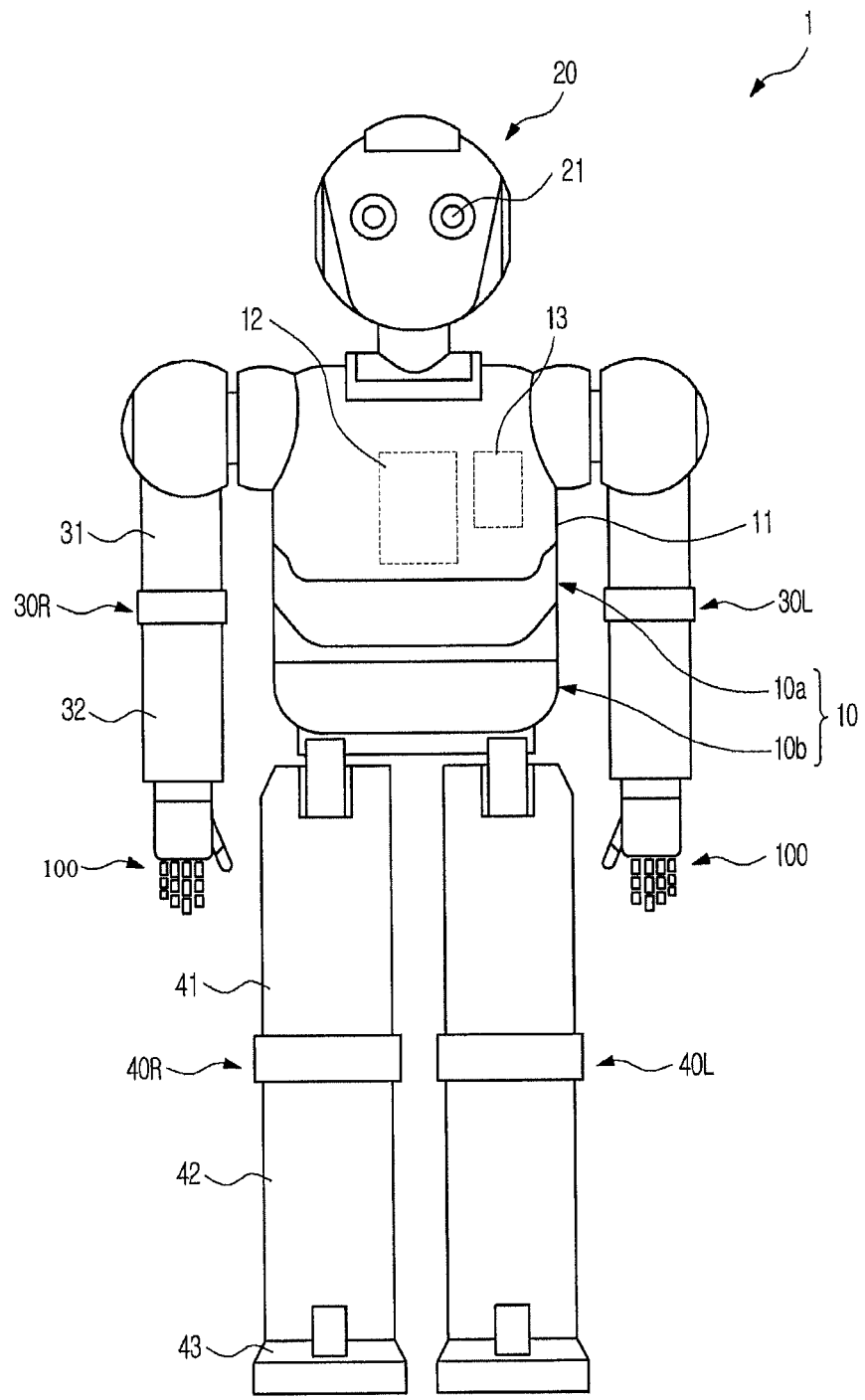
FIG. 1 is a front view illustrating an external appearance of a humanoid robot in accordance with example embodiments.

Reference will now be made in detail to embodiments, examples of which are illustrated in the accompanying drawings, wherein like reference numerals refer to like elements throughout.

FIG. 1 is a front view illustrating an external appearance of a humanoid robot in accordance with example embodiments.

As shown in FIG. 1, a humanoid robot 1 (hereinafter, simply referred to as a "robot") in accordance with example embodiments may include a torso 10, a head connected to the upper end of the torso 10, a pair of arm assemblies 30R and 30L connected to both sides of the upper part of the torso 10, and a pair of leg assemblies 40R and 40L connected to both sides of the lower part of the torso 10. "R" may represent the right side of the robot 1 and "L" may represent the left side of the robot 1.

The inside of the torso 10 may be protected by a cover 11. A control unit 12, a battery 13, and a tilt sensor (not shown) may be installed on the torso 10. The tilt sensor may detect a tilt angle of the torso 10 relative to a vertical axis and an angular velocity thereof. The torso 10 may be divided into a breast part 10a and a waist part 10b, and a joint allowing the breast part 10a to be rotated relative to the waist part 10b may be installed between the breast part 10a and the waist part 10b.

Cameras 21 functioning as eyes of the robot 1 and microphones (not shown) functioning as ears of the robot 1 may be installed on the head 20. The head 20 may be connected to the torso 10 though a neck joint unit (not shown).

Each of the leg assemblies 40R and 40L may include a thigh link 41, a calf link 42, and a foot 43. The thigh links 41 of the leg assemblies 40R and 40L may be connected to the torso 10 through thigh joint units (not shown). The thigh links 41 and the calf links 42 of the leg assemblies 40R and 40L may be connected through knee joint units (not shown), and the calf links 42 and the feet 43 of the leg assemblies 40R and 40L may be connected through ankle joint units (not shown).

Each of the arm assemblies 30R and 30L may include an upper arm link 31 and a lower arm link 32. The upper arm links 31 of the arm assemblies 30R and 30L may be connected to the torso 10 through the shoulder joint units (not shown). The upper arm links 31 and the lower arm links 32 of the arm assemblies 30R and 30L may be connected through elbow joint units (not shown). Each of the arm assemblies 30R and 30L may further include a robot hand 100'. The robot hands 100 may be connected to the lower arm links 32.

Hereinafter, the robot hands 100 will be described in detail. Because the right robot hand 100 and the left robot hand 100 may be symmetrical to each other, only the left robot hand 100 will be described.

Figure 2:
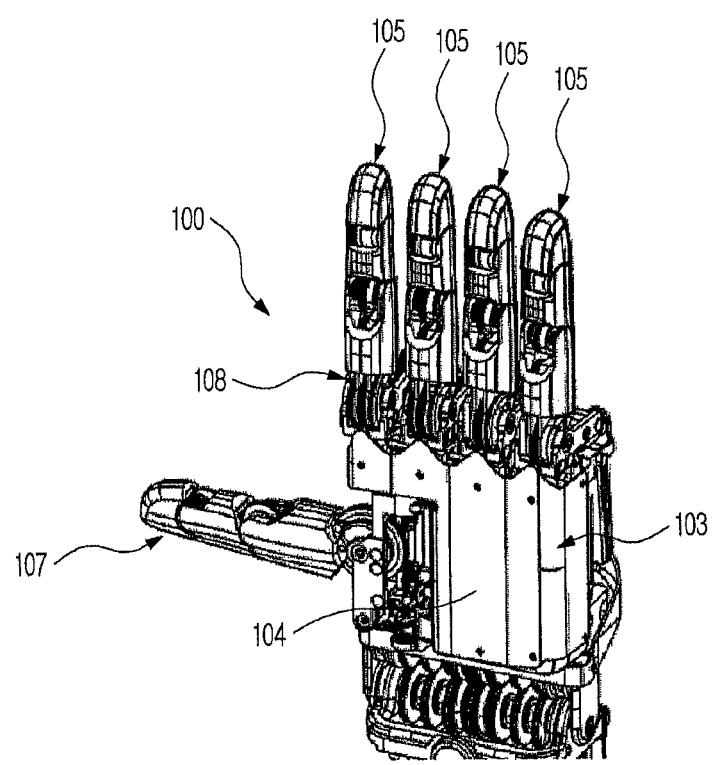
FIG. 2 is a perspective view illustrating a left robot hand.
Figure 3:
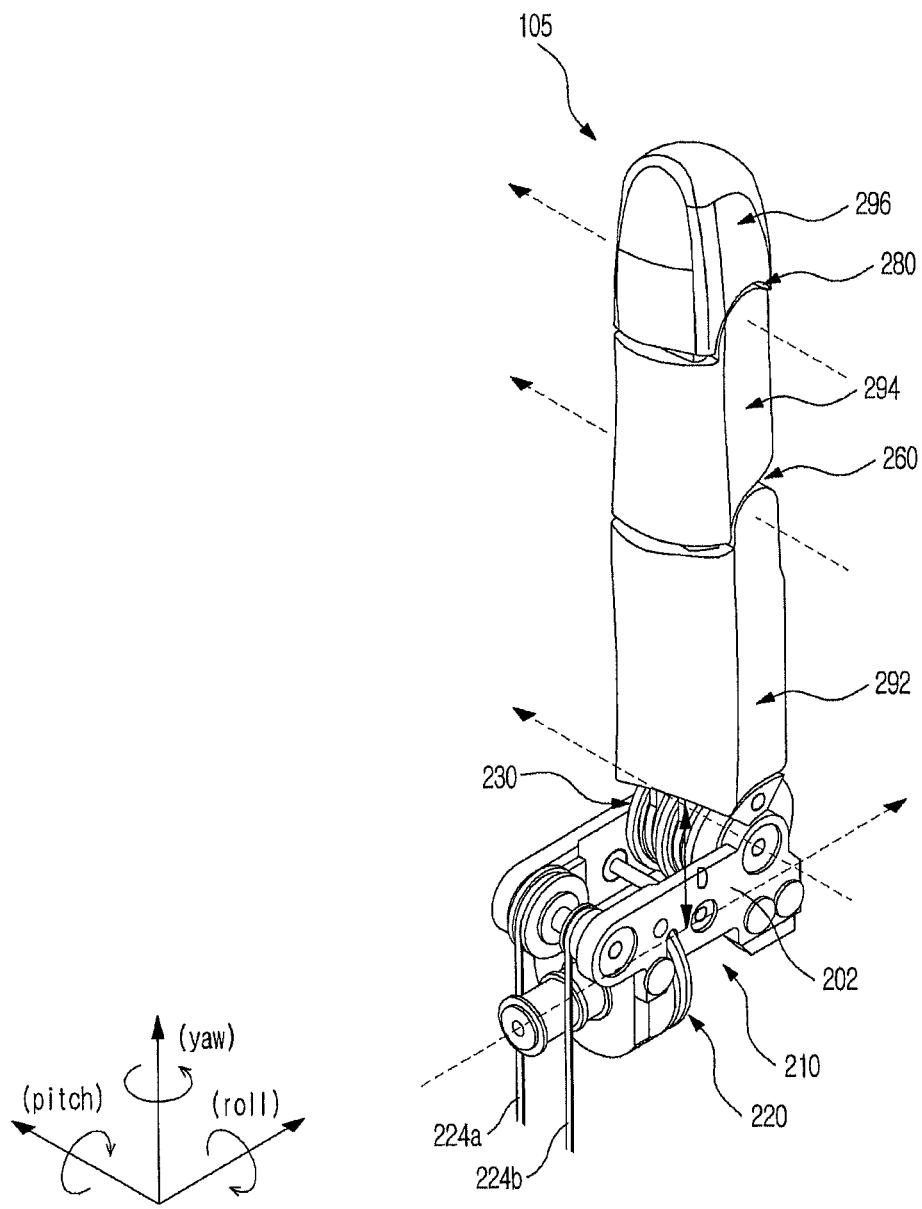
FIG. 3 is a perspective view illustrating one finger structure.
Figure 4A:
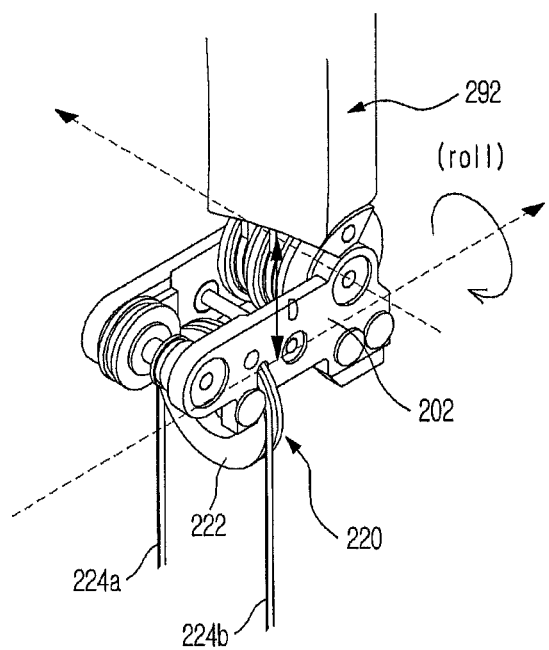
FIG. 4A is a perspective view of an MP roll joint unit.
Figure 4B:
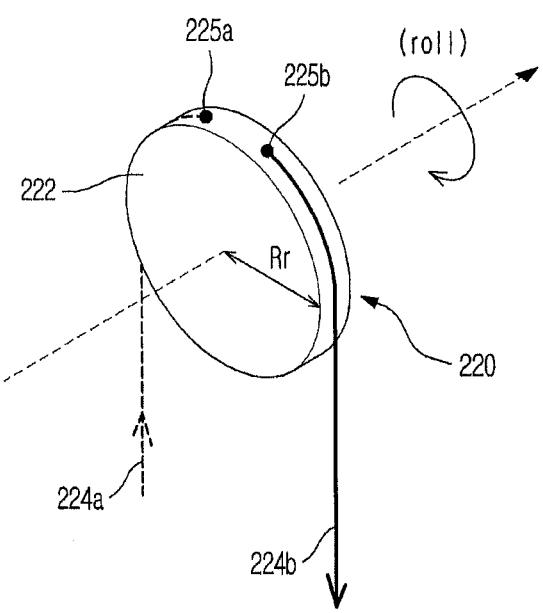
FIG. 4B is a schematic diagram of FIG. 4A.
Figure 5A:
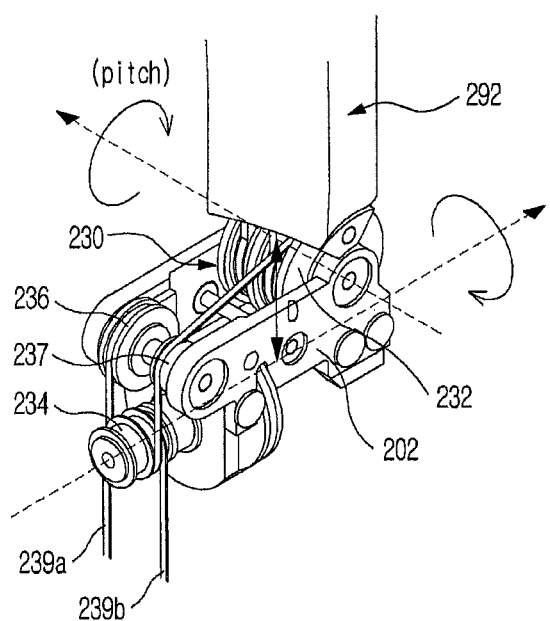
FIG. 5A is a perspective view illustrating an MP pitch joint unit.
Figure 5B:
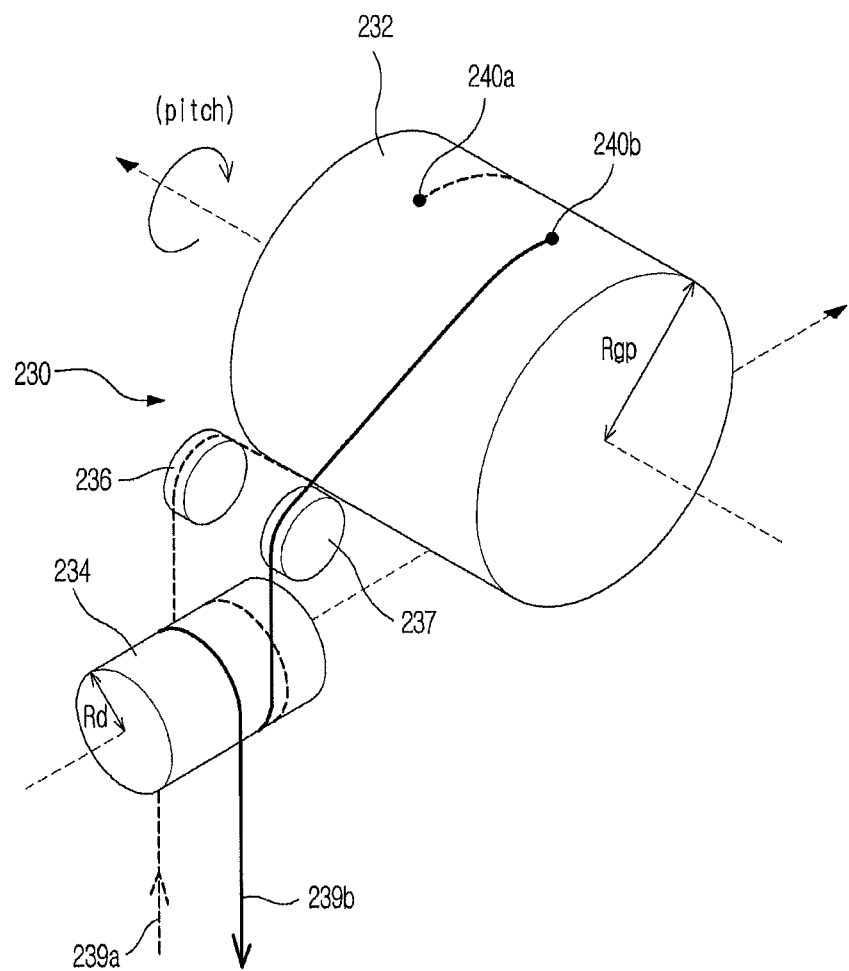
FIG. 5B is a schematic diagram of FIG. 5A.
Figure 6A:
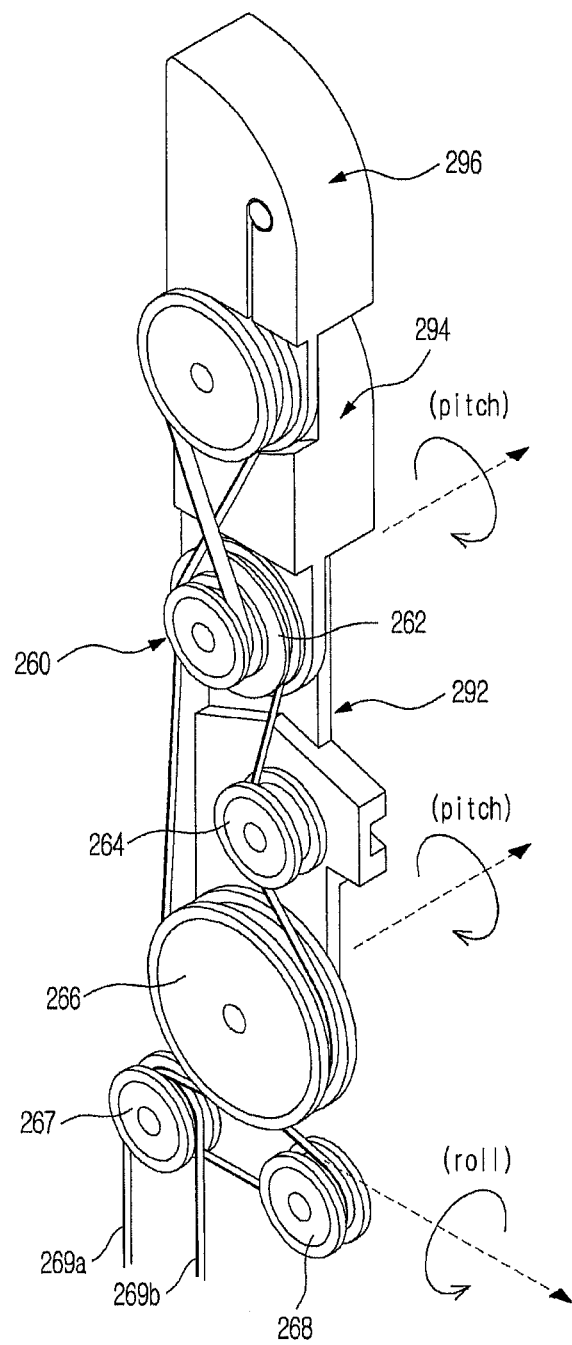
FIG. 6A is a perspective view illustrating a PIP joint unit.
Figure 6B:
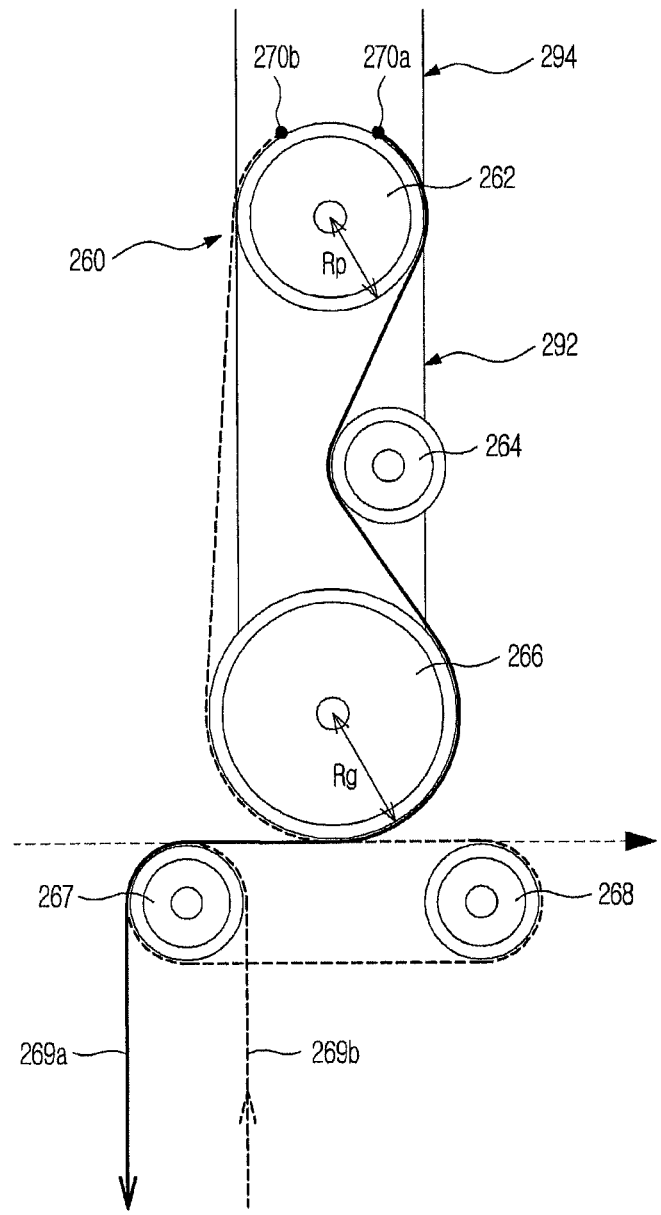
FIG. 6B is a schematic diagram of FIG. 6A.
Figure 7A:
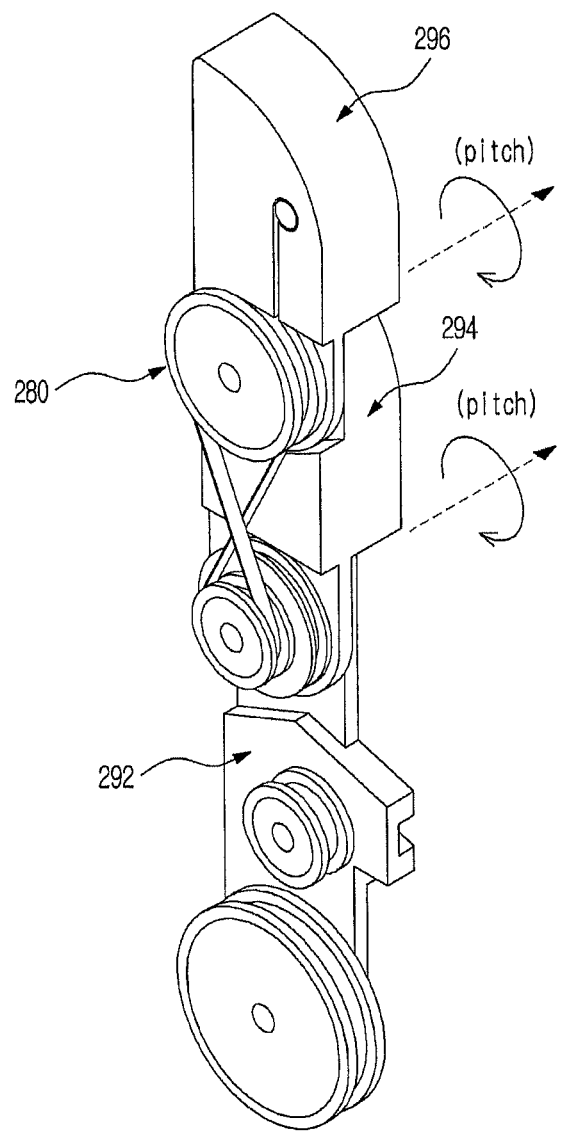
FIG. 7A is a perspective view illustrating a DIP joint unit.
Figure 7B:
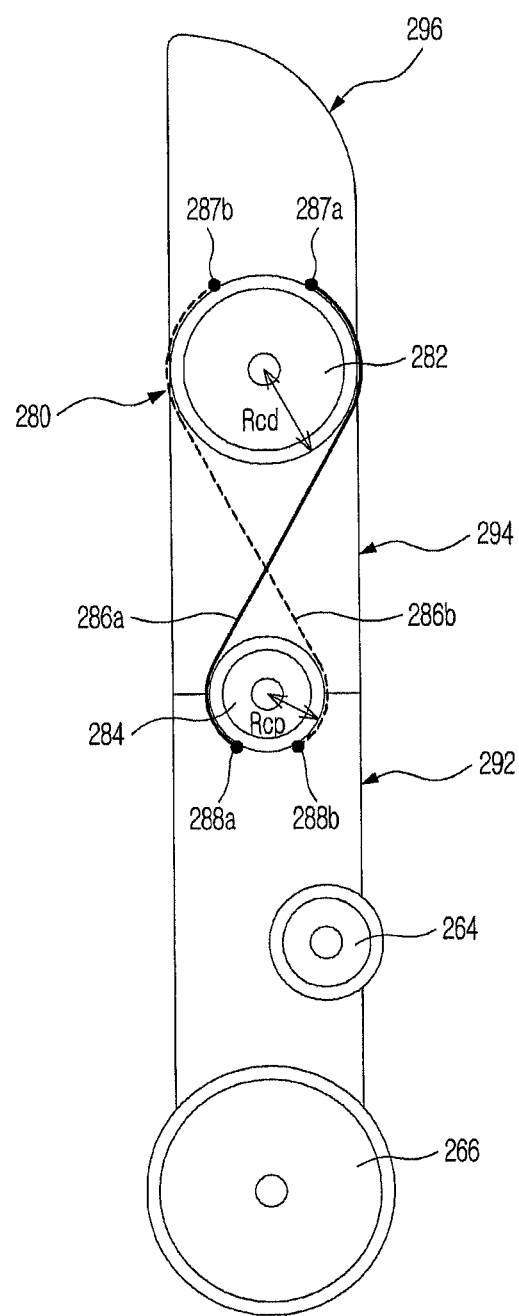
FIG. 7B is a schematic diagram of FIG. 7A.

FIG. 2 is a perspective view illustrating the left robot hand, FIG. 3 is a perspective view illustrating one finger structure, FIG. 4A is a perspective view of an meta phalangeal (MP) roll joint unit, FIG. 4B is a schematic diagram of FIG. 4A, FIG. 5A is a perspective view illustrating an MP pitch joint unit, FIG. 5B is a schematic diagram of FIG. 5A, FIG. 6A is a perspective view illustrating a proximal interphalangeal (PIP) joint unit, FIG. 6B is a schematic diagram of FIG. 6A, FIG. 7A is a perspective view illustrating a distal interphalangeal (DIP) joint unit, and FIG. 7B is a schematic diagram of FIG. 7A.

As shown in FIGS. 2 and 3, the robot hand 100 may include a base unit 103, a plurality of finger structures 105 connected to the upper part of the base unit 103, driving units (not shown) to drive the plurality of finger structures 105, and wires 108 to transmit a driving force from the driving units to the plurality of finger structures 105. A thumb structure 107 may be connected to one side of the base unit 103. The thumb structure 107 may be driven by a motor (not shown).

The base unit 103 may correspond to a part of a human hand, i.e., the palm and back of the human hand. The base unit 103 may include a palm part 104 corresponding to the palm of the human hand, and a back part (not shown) corresponding to the back of the human hand.

The plurality of finger structures 105 may be installed and extend upward from the edge of one end of the base unit 103. In example embodiments, four finger structures 105 may be provided, and the respective finger structures 105 may be configured to imitate motions of human fingers.

The respective finger structures 105 may correspond to an index finger, a middle finger, a ring finger, and a little or pinky finger of the human hand. Hereinafter, only one finger structure 105 corresponding to the middle finger will be described, and other finger structures 105 may have the same configuration as the finger structure 105 corresponding to the middle finger except size and a detailed description thereof will be omitted.

The finger structure 105 may include a meta phalangeal (MP) joint unit 210 connecting the base unit 103 and the finger structure 105, a first structure 292 connected with the MP joint unit 210, a second structure 294 connected with the first structure 292, a third structure 296 connected to the second structure 294, a proximal interphalangeal (PIP) joint unit 260 connecting the first structure 292 and the second structure 294 and rotated in a pitch direction, and a distal interphalangeal (DIP) joint unit 280 connecting the second structure 294 and the third structure 296 and rotated in the pitch direction.

The first structure 292, the second structure 294, and the third structure 296 may correspond to links of a human finger, and the respective structures 292, 294, and 296 may perform motions similar to those of the human finger through the MP joint unit 210, the PIP joint unit 260, and the DIP joint unit 280.

With reference to FIGS. 3 to 5B, the MP joint unit 210 may have two degrees of freedom (DOFs), and include an MP roll joint unit 220 rotated in a roll direction, and an MP pitch joint unit 230 rotated in the pitch direction. The MP roll joint unit 220 and the MP pitch joint unit 230 may be provided on a frame 202 of the MP joint unit 210.

The MP roll joint unit 220 may include an MP roll pulley 222 rotated in the roll direction, and the MP roll pulley 222 may be rotated by a first MP roll wire 224a and a second MP roll wire 224b. One end 225a of the first MP roll wire 224a and one end 225b of the second MP roll wire 224b may be fixed to the MP roll pulley 222, and the first MP roll wire 224a and the second MP roll wire 224b may be wound on the MP roll pulley 222 in opposite directions and driven by a driving unit (not shown) provided therebelow.

An operation of the MP roll joint unit 220 will be described. The first MP roll wire 224a and the second MP roll wire 224b may be driven by the driving unit, the MP roll pulley 222 may be rotated in the roll direction, and the frame 202 connected to the MP roll pulley 222 may be rotated in the roll direction, thereby rotating the first structure 292 in the roll direction.

The MP pitch joint unit 230 may include a first MP pitch pulley 232 fixed to the first structure 292 and rotated in the pitch direction, a second MP pitch pulley 234 freely rotated coaxially with the MP roll joint unit 220, and a third MP pitch pulley 236 and a fourth MP pitch pulley 237 arranged between the first MP pitch pulley 232 and the second MP pitch pulley 234 and freely rotated.

The MP pitch joint unit 230 may be driven by a first MP pitch wire 239a and a second MP pitch wire 239b. One end 240a of the first MP pitch wire 239a may be fixed to the first MP pitch pulley 232, and the first MP pitch wire 239a may be wound on the first MP pitch pulley 232, pass through the third MP pitch pulley 236, wound on the second MP pitch pulley 234 one time, and then extended downward. One end 240b of the second MP pitch wire 239b may be fixed to the first MP pitch pulley 232, and the second MP pitch wire 239b may be wound on the first MP pitch pulley 232 in the direction opposite to the winding direction of the first MP pitch wire 239a, pass through the fourth MP pitch pulley 237, wound on the second MP pitch pulley 234 one time in the direction opposite to the winding direction of the first MP pitch wires 239a, and then extended downward.

An operation of the MP pitch joint unit 230 will be described. The first MP pitch wire 239a and the second MP pitch wire 239b may be driven by a driving unit, the second MP pitch pulley 234 and the third and fourth MP pitch pulleys 236 and 237 connected thereto may be rotated, and the first MP pitch pulley 232 may be rotated in the pitch direction, thereby rotating the first structure 292.

The MP roll joint unit 220 and the MP pitch joint unit 230 may be separately arranged to form an offset D (with reference to FIGS. 3, 4A and 5A). A rotary axis of the MP roll pulley 222 rotated in the roll direction and a rotary axis of the MP pitch pulley 232 rotated in the pitch direction may be perpendicular to each other, and separated from each other by an interval of the offset D.

The MP roll joint unit 220 and the MP pitch joint unit 230 may be separated from each other by the interval of the offset D to operate the respective joint units 220, 230, 260, and 280 so that rotation of each of the joint units 220, 230, 260, and 280 does not influence the remaining joints.

Further, the separate arrangement of the MP roll joint unit 220 and the MP pitch joint unit 230 may serve to prevent the wire 108 driving each of the joints 220, 230, 260, and 280 from being excessively strained or loosened due to operations of other joints. Thereby, sufficient movable angles of the respective joint units 220, 230, 260, and 280 may be obtained, and friction of the entire driving system may be reduced and the entire system stabilized.

With reference to FIGS. 6A and 6B, the PIP joint unit 260 may include a first PIP pulley 262 fixed to the second structure 294 and rotated in the pitch direction, a second PIP pulley 264 arranged below the first PIP pulley 262 and freely rotated, a third PIP pulley 266 arranged below the second PIP pulley 264 and freely rotated coaxially with the first MP pitch pulley 232, and a fourth PIP pulley 267 and a fifth PIP pulley 268 arranged in parallel below the third PIP pulley 266 and freely rotated.

The PIP joint unit 260 may be driven by a first PIP wire 269a and a second PIP wire 269b. One end 270a of the first PIP wire 269a may be fixed to the first PIP pulley 262, and the first PIP wire 269a may be wound on the first PIP pulley 262, pass through the second PIP pulley 264 and the third PIP pulley 266, arranged coaxially with the rotary axis of the MP roll joint unit 220, pass through the fourth PIP pulley 267, and then extended downward. One end 270b of the second PIP wire 269b may be fixed to the first PIP pulley 262, and the second PIP wire 269b may be wound on the first PIP pulley 262 in a direction opposite to a winding direction of the first PIP wire 269a, pass through the third PIP pulley 266, arranged coaxially with the rotary axis of the MP roll joint unit 220, pass through the fifth PIP pulley 268, wound on the fourth PIP pulley 267 one time, and then extended downward.

The first PIP wire 269a and the second PIP wire 269b may be arranged coaxially with the rotary axis of the MP roll joint unit 220 in order to minimize an influence of rotation of the MP roll joint unit 220 on driving of the PIP joint unit 260. Although the MP roll joint unit 220 is rotated, the first PIP wire 269a and the second PIP wire 269b may not be influenced by the rotation of the MP roll joint unit 220 but rather are only slightly twisted.

An operation of the PIP joint unit 260 will be described. The first PIP wire 269a and the second PIP wire 269b may be driven by a driving unit, the fourth PIP pulley 267, the fifth PIP pulley 268, the third PIP pulley 266, and the second PIP pulley 264 may be freely sequentially rotated, and the first PIP pulley 262 may be rotated, thereby rotating the second structure 294 in the pitch direction.

With reference to FIGS. 7A and 7B, the DIP joint unit 280 may include a first DIP pulley 282 fixed to the third structure 296 and may be rotated in the pitch direction, and a second DIP pulley 284 may be rotated in connection with the second structure 294.

The first DIP pulley 282 and the second DIP pulley 284 may be connected by a first DIP wire 286a and a second DIP wire 286b. One end 287a of the first DIP wire 286a may be fixed to the first DIP pulley 282 and wound on the first DIP pulley 282, and the other end 288a of the first DIP wire 286a may be fixed to the second DIP pulley 284 and wound on the second DIP pulley 284. One end 287b of the second DIP wire 286b may be fixed to the first DIP pulley 282 and wound on the first DIP pulley 282 in a direction opposite to a winding direction of the first DIP wire 286a, and the other end 288b of the second DIP wire 286b may be fixed to the second DIP pulley 284 and wound on the second DIP pulley 284 in the direction opposite to the winding direction of the first DIP wire 286a. The first DIP wire 286a and the second DIP wire 286b may cross each other, and form an X shape.

An operation of the DIP joint unit 280 will be described. The second DIP pulley 284 may be rotated by movement of the second structure 294, the first DIP pulley 282 connected to the second DIP pulley 284 by the first DIP wire 286a and the second DIP wire 286b may be rotated, and the third structure 296 may be rotated in the pitch direction. The first DIP pulley 282 connected to the second DIP pulley 284 may be rotated according to the ratio of the reciprocal of the radius of the first DIP pulley 282 to the reciprocal of the radius of the second DIP pulley 284.

FIG. 8 is a relational expression illustrating relations between movements of the wires and rotating angles of the respective joints unit using radii of the respective pulleys.

The above-described MP joint unit 210, PIP joint unit 260, and DIP joint unit 280 may be rotated respectively based on a relational expression, shown in FIG. 8.

In the relational expression, Qr represents a rotating angle of the MP roll joint unit 220, Qm represents a rotating angle of the MP pitch joint unit 230, Qp represents a rotating angle of the PIP joint unit 260, and Qd represents a rotating angle of the DIP joint unit 280. Further, Lr represents a moving distance of the MP roll wires 224a and 224b, Lp represents a moving distance of the MP pitch wires 239a and 239b, and Lg represents a moving distance of the PIP wires 269a and 269b. Moreover, Rr represents a radius of the MP roll pulley 222, Rgp represents a radius of the first MP pitch pulley 232, Rd represents a radius of the second MP pitch pulley 234, Rp represents a radius of the first PIP pulley 262, Rg represents a radius of the third PIP pulley 266, Rcd represents a radius of the first DIP pulley 282, and Rdp represents a radius of the second DIP pulley 284. Nd represents a rotating direction, and may have a value of +1 or −1. Radii of the third MP pitch pulley 236, the fourth MP pitch pulley 237, the second PIP pulley 264, the fourth PIP pulley 267, and the fifth PIP pulley 268, which are not shown in the relational expression of FIG. 8, may be irrelevant to the rotating angles of the respective joint units 210, 260, and 280.

As shown in the relational expression of FIG. 8, when the MP roll wires 224a and 224b, the MP pitch wires 239a and 239b, and the PIP wires 269a and 269b of the respective joint units 210, 260, and 280 of the finger structure 105 move by the respective moving distances Lr, Lp, and Lg through the driving units, the respective joint units 210, 260, and 280 may be rotated by the designated angles Qr, Qm, Qp, and Qd based on radius designs of the respective pulleys in the finger structure 105. The robot hand 100 may be precisely controlled according to such a relational expression.

Hereinafter, example embodiments will be described. Some parts in the example embodiments are substantially the same as those as previously described and thus are denoted by the same reference numerals even though they are depicted in different drawings.

Figure 9:
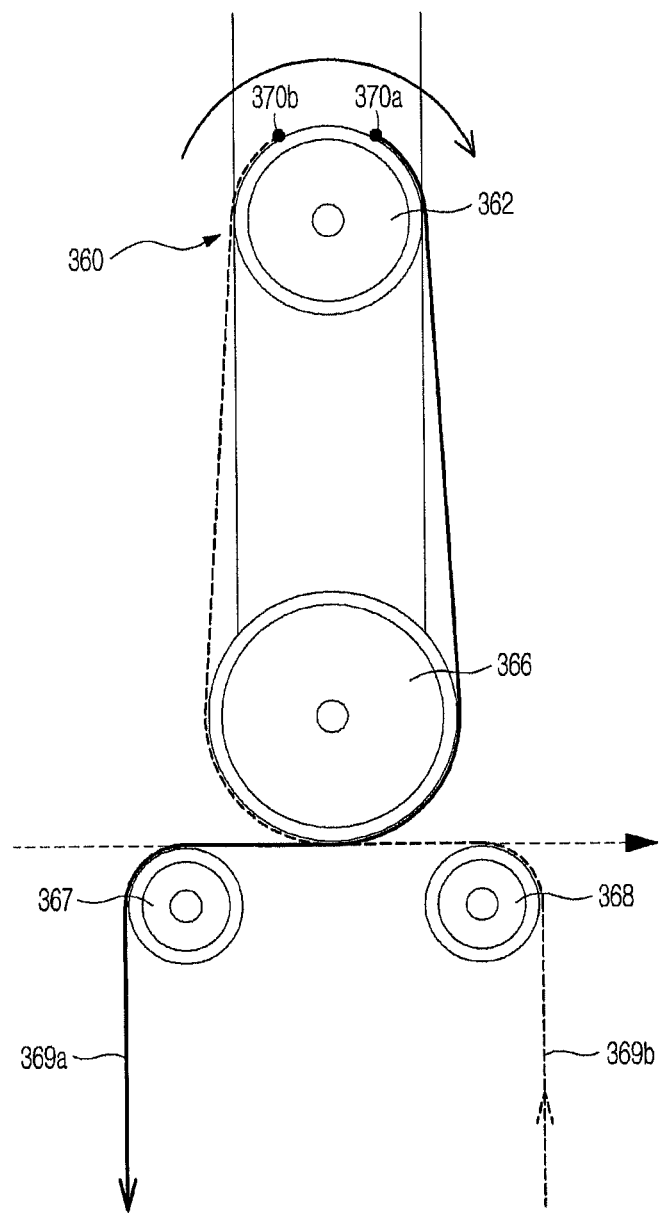
FIG. 9 is a schematic diagram illustrating a PIP joint unit in accordance with example embodiments.

FIG. 9 is a schematic diagram illustrating a PIP joint unit in accordance with example embodiments.

The PIP joint unit 260 may be replaced with a PIP joint unit 360 in accordance with example embodiments, as shown in FIG. 9.

The PIP joint unit 360 of FIG. 9 may include an eleventh PIP pulley 362 fixed to the second structure 294 and rotated in the pitch direction, a twelfth PIP pulley 366 arranged below the eleventh PIP pulley 362 and freely rotated coaxially with the first MP pitch pulley 232, and a thirteenth PIP pulley 367 and a fourteenth PIP pulley 368 arranged below the twelfth PIP pulley 366 in parallel with each other and freely rotated.

The PIP joint unit 360 may be driven by an eleventh PIP wire 369a and a twelfth PIP wire 369b. One end 370a of the eleventh PIP wire 369a may be fixed to the eleventh PIP pulley 362, and the eleventh PIP wire 369a may be wound on the eleventh PIP pulley 362, pass through the twelfth PIP pulley 366, arranged coaxially with the rotary axis of the MP roll joint unit 220, pass through the thirteenth PIP pulley 367, and then extended downward. One end 370b of the twelfth PIP wire 369b may be fixed to the eleventh PIP pulley 362, and the twelfth PIP wire 369b may be wound on the eleventh PIP pulley 362 in the direction opposite to the winding direction of the eleventh PIP wire 369a, pass through the twelfth PIP pulley 366, arranged coaxially with the rotary axis of the MP roll joint unit 220, pass through the fourteenth PIP pulley 368, and then extended downward.

The PIP joint unit 360 of FIG. 9 may differ from the PIP joint unit 260 of FIGS. 6A and 6B because the arrangement of the eleventh PIP wire 369a and the twelfth PIP wire 369b differ from arrangement of the first PIP wire 269a and the second PIP wire 269b and the PIP joint unit 360 does not include the second PIP pulley 264. Other parts and operation of the PIP joint unit 360 shown in FIG. 9 may be the same as those of the PIP joint unit 260 of FIGS. 6A and 6B.

According to example embodiments, a robot hand and a robot having the same may include an MP roll joint unit and an MP pitch joint unit separated from each other to form an offset, thereby preventing movements of joints of a finger structure from influencing operations of other joints.

Further, friction of wires may be minimized, and excessive load applied to the wires and loosening of the wires may be prevented, thereby stabilizing an entire driving system.

Moreover, movable angles of joints of finger structures may be widened, and the finger structures may be precisely controlled.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A robot hand, comprising:
 a base unit;
 a plurality of finger structures connected to the base unit;
 driving units to drive the plurality of finger structures; and
 wires to transmit a driving force from the driving units to the plurality of finger structures, each of the plurality of finger structures including a meta phalangeal (MP) joint unit connecting the base unit and each of the plurality of finger structures, wherein:
 the MP joint unit includes an MP roll joint unit rotated in a roll direction, and an MP pitch joint unit rotated in a pitch direction; and
 the MP roll joint unit and the MP pitch joint unit are separately arranged to form an offset along a roll joint axis.

2. The robot hand according to claim 1, wherein each of the plurality of finger structures further includes a first structure connected to the MP pitch joint unit, a second structure connected to the first structure, a third structure connected to the second structure, a proximal interphalangeal (PIP) joint unit connecting the first structure and the second structure and rotated in the pitch direction, and a distal interphalangeal (DIP) joint unit connecting the second structure and the third structure and rotated in the pitch direction.

3. The robot hand according to claim 2, wherein the MP pitch joint unit includes a first MP pitch pulley fixed to the first structure and rotated in the pitch direction, a second MP pitch pulley freely rotated coaxially with the MP roll joint unit, and a third MP pitch pulley and a fourth MP pitch pulley arranged between the first MP pitch pulley and the second MP pitch pulley and freely rotated.

4. The robot hand according to claim 3, wherein:
 the wires include a first MP pitch wire and a second MP pitch wire to drive the MP pitch joint unit;
 the first MP pitch wire is fixed to and wound on the first MP pitch pulley, passes through the third MP pitch pulley, is wound on the second MP pitch pulley one time, and is extended downward; and
 the second MP pitch wire is fixed to and wound on the first MP pitch pulley in a direction opposite to a winding direction of the first MP pitch wire, passes through the fourth MP pitch pulley, is wound on the second MP pitch pulley one time in a direction opposite to a winding direction of the first MP pitch wire, and is extended downward.

5. The robot hand according to claim 2, wherein the PIP joint unit includes a first PIP pulley fixed to the second structure and rotated in the pitch direction, a second PIP pulley arranged below the first PIP pulley and freely rotated, a third PIP pulley arranged below the second PIP pulley and freely rotated coaxially with the first MP pitch pulley, and a fourth PIP pulley and a fifth PIP pulley arranged in parallel and below the third PIP pulley and freely rotated.

6. The robot hand according to claim 5, wherein:
 the wires include a first PIP wire and a second PIP wire to drive the PIP joint unit;
 the first PIP wire is fixed to and wound on the first PIP pulley, passes through the second PIP pulley and the third PIP pulley, is arranged coaxially with a rotary axis of the MP roll joint unit, passes through the fourth PIP pulley, and is extended downward; and
 the second PIP wire is fixed to and wound on the first PIP pulley in a direction opposite to a winding direction of the first PIP wire, passes through the third PIP pulley, is arranged coaxially with the rotary axis of the MP roll joint unit, passes through the fifth PIP pulley, is wound on the fourth PIP pulley one time, and is extended downward.

7. The robot hand according to claim 2, wherein the DIP joint unit includes a first DIP pulley fixed to the third structure and rotated in the pitch direction, and a second DIP pulley rotated in connection with the second structure.

8. The robot hand according to claim 7, wherein the wires include a first DIP wire provided with one end fixed to and wound on the first DIP pulley and another end fixec to and wound on the second DIP pulley, and a second DIP wire provided with one end fixed to and wound on the first DIP pulley in a direction opposite to a winding direction of the first DIP wire and another end fixed to and wound on the second DIP pulley in a direction opposite to a winding direction of the first DIP wire.

9. The robot hand according to claim 8, wherein the first DIP wire and the second DIP wire cross.

10. The robot hand according to claim 2, wherein the PIP joint unit include an eleventh PIP pulley fixed to the second structure and rotated in the pitch direction, a twelfth PIP pulley arranged below the eleventh PIP pulley and freely rotated coaxially with the first MP pitch pulley, and a thirteenth PIP pulley and a fourteenth PIP pulley arranged in parallel below the twelfth PIP pulley and freely rotated.

11. The robot hand according to claim 10, wherein:
the wires include an eleventh PIP wire and a twelfth PIP wire to drive the PIP joint unit;
the eleventh PIP wire is fixed to and wound on the eleventh PIP pulley, passes through the twelfth PIP pulley, is arranged coaxially with a rotary axis of the MP roll joint unit, passes through the thirteenth PIP pulley, and is extended downward; and
the twelfth PIP wire is fixed to and wound on the eleventh PIP pulley in a direction opposite to a winding direction of the eleventh PIP wire, passes through the twelfth PIP pulley, arranged coaxially with the rotary axis of the MP roll joint unit, passes through the fourteenth PIP pulley, and is extended downward.

12. The robot hand according to claim 1, wherein:
the MP roll joint unit includes an MP roll pulley rotated in the roll direction; and
the wires include a first MP roll wire and a second MP roll wire, each having one end fixed to the MP roll pulley, and wound on the MP roll pulley in opposite directions.

13. A robot having a robot hand which grips an object, the robot hand comprising:
a base unit;
a plurality of finger structures connected to the base unit;
driving units to drive the plurality of finger structures; and
wires to transmit a driving force from the driving units to the plurality of finger structures each of the plurality of finger structures including a meta phalangeal (MP) joint unit connecting the base unit and each of the plurality of finger structures, wherein:
the MP joint unit includes an MP roll joint unit rotated in a roll direction, and an MP pitch joint unit rotated in a pitch direction; and
the MP roll joint unit and the MP pitch joint unit are separately arranged with an offset along a roll joint axis to prevent movement of one of the MP roll joint unit and the MP pitch joint unit from influencing operation of the other one of the MP roll joint unit and the MP pitch joint unit.

14. The robot according to claim 13, wherein each of the plurality of finger structures further includes a first structure connected to the MP pitch joint unit, a second structure connected to the first structure, a third structure connected to the second structure, a proximal interphalangeal (PIP) joint unit connecting the first structure and the second structure and rotated in the pitch direction, and a distal interphalangeal (DIP) joint unit connecting the second structure and the third structure and rotated in the pitch direction.

15. The robot according to claim 14, wherein the MP pitch joint unit includes a first MP pitch pulley fixed to the first structure and rotated in the pitch direction, a second MP pitch pulley freely rotated coaxially with the MP roll joint unit, and a third MP pitch pulley and a fourth MP pitch pulley arranged and freely rotated between the first MP pitch pulley and the second MP pitch pulley.

16. The robot according to claim 15, wherein:
the wires include a first MP pitch wire and a second MP pitch wire to drive the MP pitch joint unit;
the first MP pitch wire is fixed to and wound on the first MP pitch pulley, passes through the third MP pitch pulley, is wound on the second MP pitch pulley one time, and is extended downward; and
the second MP pitch wire is fixed to and wound on the first MP pitch pulley in a direction opposite to a winding direction of the first MP pitch wire, passes through the fourth MP pitch pulley, is wound on the second MP pitch pulley one time in the direction opposite to the winding direction of the first MP pitch wire, and is extended downward.

17. The robot according to claim 14, wherein the PIP joint unit includes a first PIP pulley fixed to the second structure and rotated in the pitch direction, a second PIP pulley arranged below the first PIP pulley and freely rotated, a third PIP pulley arranged below the second PIP pulley and freely rotated coaxially with the first MP pitch pulley, and a fourth PIP pulley and a fifth PIP pulley arranged in parallel and below the third PIP pulley and freely rotated.

18. The robot according to claim 17, wherein:
the wires include a first PIP wire and a second PIP wire to drive the PIP joint unit;
the first PIP wire is fixed to and wound on the first PIP pulley, passes through the second PIP pulley and the third PIP pulley, is arranged coaxially with a rotary axis of the MP roll joint unit, passes through the fourth PIP pulley, and is extended downward; and
the second PIP wire is fixed to and wound on the first PIP pulley in a direction opposite to a winding direction of the first PIP wire, passes through the third PIP pulley, is arranged coaxially with the rotary axis of the MP roll joint unit, passes through the fifth PIP pulley, is wound on the fourth PIP pulley one time, and is extended downward.

19. The robot according to claim 14, wherein the DIP joint unit includes a first DIP pulley fixed to the third structure and rotated in the pitch direction, and a second DIP pulley rotated in connection with the second structure.

20. The robot according to claim 19, wherein the wires include a first DIP wire provided with one end fixed to and wound on the first DIP pulley and another end fixed to and wound on the second DIP pulley, and a second DIP wire provided with one end fixed to and wound on the first DIP pulley in a direction opposite to a winding direction of the first DIP wire and another end fixed to and wound on the second DIP pulley in the direction opposite to the winding direction of the first DIP wire.

21. The robot according to claim 20, wherein the first DIP wire and the second DIP wire cross.

22. The robot according to claim 13, wherein:
the MP roll joint unit includes an MP roll pulley rotated in the roll direction; and
the wires include a first MP roll wire and a second MP roll wire, each provided with one end fixed to the MP roll pulley, and wound on the MP roll pulley in opposite directions.

* * * * *

UNITED STATES PATENT AND TRADEMARK OFFICE
CERTIFICATE OF CORRECTION

PATENT NO.        : 8,419,096 B2
APPLICATION NO.   : 12/984945
DATED             : April 16, 2013
INVENTOR(S)       : Yong Jae Kim et al.

Page 1 of 1

It is certified that error appears in the above-identified patent and that said Letters Patent is hereby corrected as shown below:

In the Claims:

Column 11, Line 3, In Claim 8, delete "fixec" and insert -- fixed --, therefor.

Column 11, Line 13 (Approx.), In Claim 10, delete "include" and insert -- includes --, therefor.

Column 11, Line 31, In Claim 11, delete "pulley," and insert -- pulley, is --, therefor.

Column 11, Line 46, In Claim 13, delete "structures" and insert -- structures, --, therefor.

Signed and Sealed this
Thirteenth Day of August, 2013

Teresa Stanek Rea
*Acting Director of the United States Patent and Trademark Office*